Jan. 3, 1967 J. FEINSTEIN 3,296,484

LOW MAGNETIC FIELD CYCLOTRON WAVE COUPLERS

Filed Aug. 2, 1961 3 Sheets-Sheet 1

INVENTOR.
JOSEPH FEINSTEIN

BY Harry E. Aine

ATTORNEY

LOW MAGNETIC FIELD CYCLOTRON WAVE COUPLERS

Filed Aug. 2, 1961 3 Sheets-Sheet 2

INVENTOR.
JOSEPH FEINSTEIN
BY
Harry E. Aine
ATTORNEY

LOW MAGNETIC FIELD CYCLOTRON WAVE COUPLERS

Filed Aug. 2, 1961 3 Sheets-Sheet 3

INVENTOR.
JOSEPH FEINSTEIN
BY [signature]
ATTORNEY 3,296,484
Patented Jan. 3, 1967

3,296,484

LOW MAGNETIC FIELD CYCLOTRON WAVE COUPLERS

Joseph Feinstein, Livingston, N.J., assignor to S-F-D Laboratories, Inc., Union, N.J., a corporation of New Jersey Filed Aug. 2, 1961, Ser. No. 128,881
3 Claims. (Cl. 315—5.27)

Figure 1:
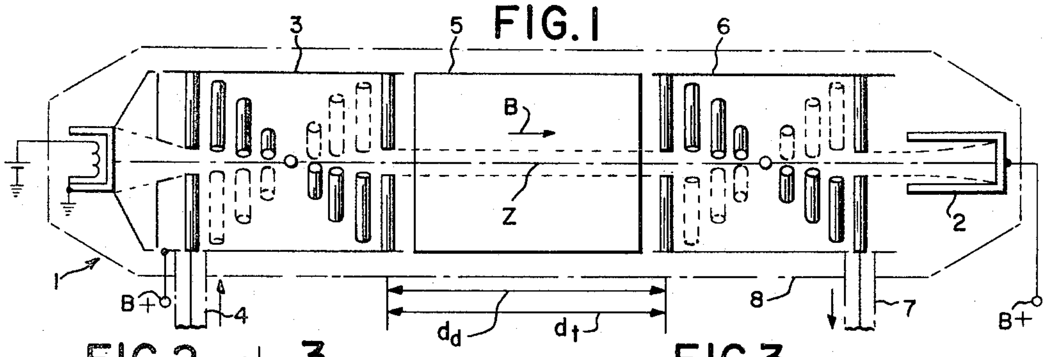

The present invention relates in general to transverse wave beam couplers and more specifically to such couplers operable at magnetic field intensities well below the cyclotron resonance field intensity at the coupled signal frequency thereby making such couplers especially useful for coupling signal wave energy to a parametric beam amplifier.

Heretofore, transverse wave beam couplers have been utilized with parametric beam amplifier tubes. These prior art beam couplers were generally designed to couple signal energy to the fast cyclotron wave and included, typically, a pair of parallel plates disposed straddling the beam, the beam being immersed in a longitudinally directed magnetic field B of an intensity substantially great enough to produce cyclotron resonance of the beam particles, typically electrons, substantially at the signal frequency. Such a prior art beam coupler is known in the art as a Cuccia coupler.

One disadvantage of the Cuccia type coupler is that it requires an axial magnetic field B of a magnitude equal approximately to the cyclotron magnetic field intensity at the signal frequency. For example, an electron beam excited by a Cuccia coupler at a signal frequency of approximately 60 kmc. requires a cyclotron magnetic field B of approximately 20 kilogauss. Such an extremely high magnetic field intensity is difficult and expensive to produce even over a relatively short gap.

Another disadvantage of the Cuccia coupler is encountered, when it is utilized with D.C. pumped quadrupole parametric amplifier sections, since such D.C. pumped sections are preferably operated at magnetic field intensities, well below the cyclotron resonance field intensity as, for example, 1000 gauss at a signal frequency of 60 kmc. Thus when using the Cuccia coupler a jump in the axial magnetic field intensity B from 20 kilogauss down to 1 kilogauss through the D.C. amplifier section and then a jump back to 20 kilogauss in the output Cuccia coupler section would be typical. Such jumps in the magnetic field intensity are difficult to obtain in practice.

In the present invention a number of coupler embodiments are provided for coupling to the transverse waves of a beam of charged particles. These couplers couple signal wave energy onto the beam at magnetic field intensities substantially less than the cyclotron magnetic field intensity for the signal frequency.

Certain ones of these transverse beam couplers provide linear polarization of the beam, such linear polarization being especially suitable for use with D.C. pumped quadrupole amplifying sections whereby maximum efficiency of the amplifying section is obtained.

Certain others of the couplers of the present invention include a plurality of coupled wave-beam interaction regions for obtaining a relatively broadband response in the coupling to the beam.

Still others of the couplers of the present invention are especially formed and arranged for coupling to predominantly the fast cyclotron wave at subharmonic magnitudes of the cyclotron magnetic field for the signal frequency, thereby allowing the use of much reduced magnetic field intensities.

The principal object of the present invention is to provide improved transverse wave beam couplers and devices using such couplers and certain of said couplers and devices being operable at magnetic field intensities substantially less than the cyclotron magnetic field intensity for the signal frequency, whereby the total magnetic field requirement for beam devices utilizing such couplers may be greatly reduced.

One feature of the present invention is the provision of a two pin resonant cavity coupler, the resonant pins being disposed transversely of the beam of charged particles, and the interaction length of the transverse electric field, lengthwise of the beam, being small compared to the operating cyclotron wavelength whereby the pin coupler may be efficiently used at axial magnetic field intensities substantially less than the cyclotron intensity at the signal frequency.

Other features and advantages of the present invention will become apparent upon a perusal of the specification taken in connection with the accompanying drawings wherein, FIG. 1 is a schematic diagram of one form of parametric beam amplifier to which the transverse wave beam coupler of the present invention is especially adapted.

Figure 2:
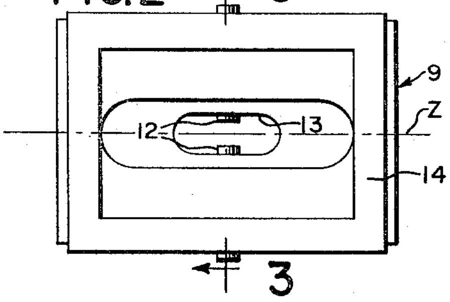
Figure 3:
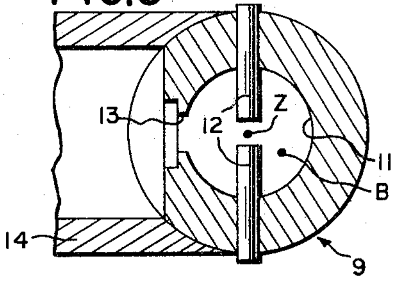
Figures 4, 5, 6, 7, 8:
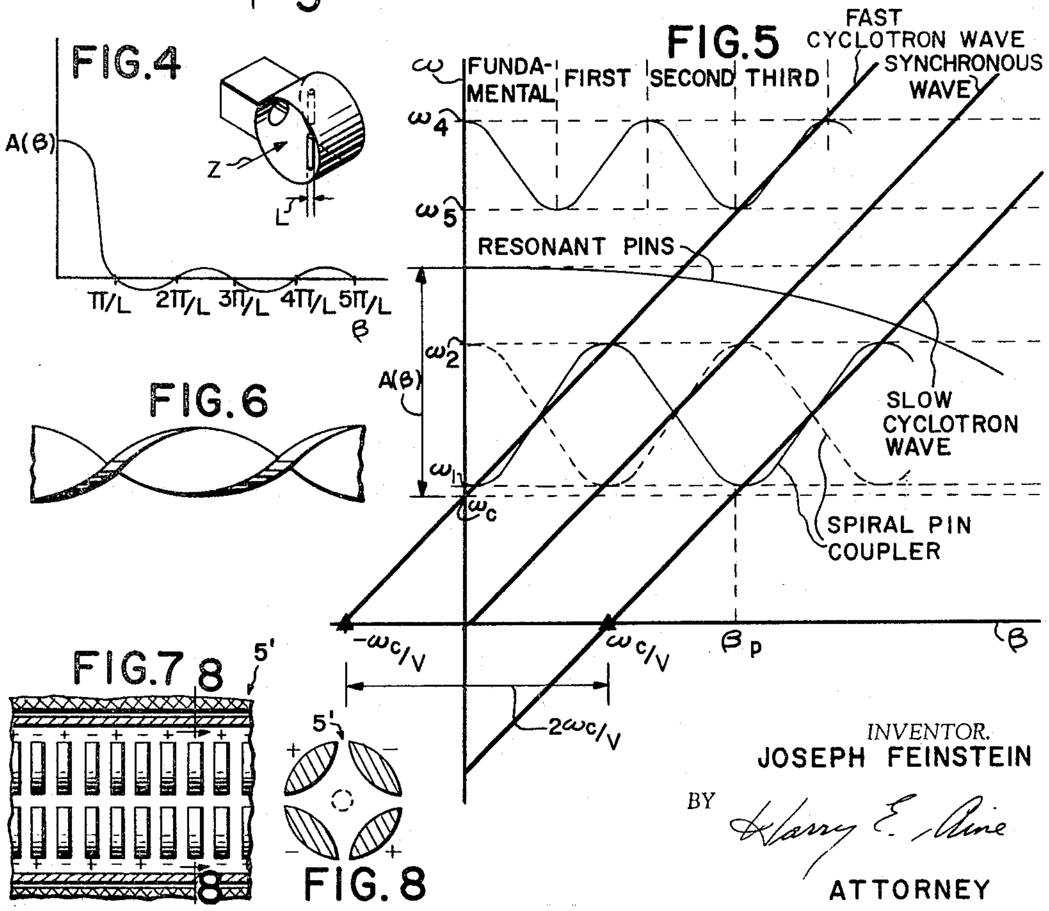
Figure 10:
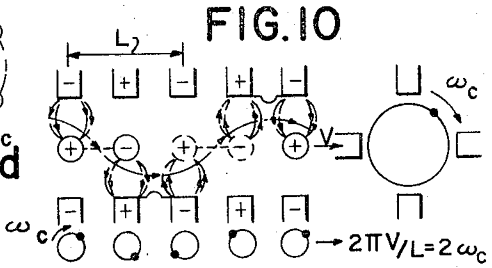
Figures 11, 12:
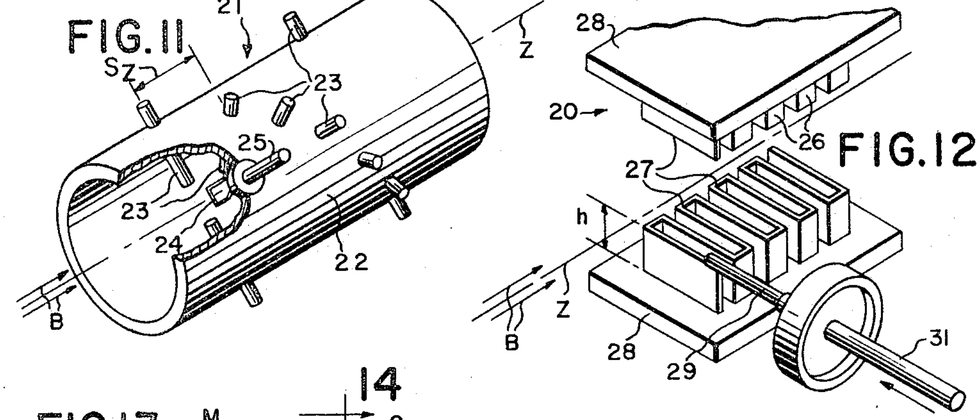
Figure 13:
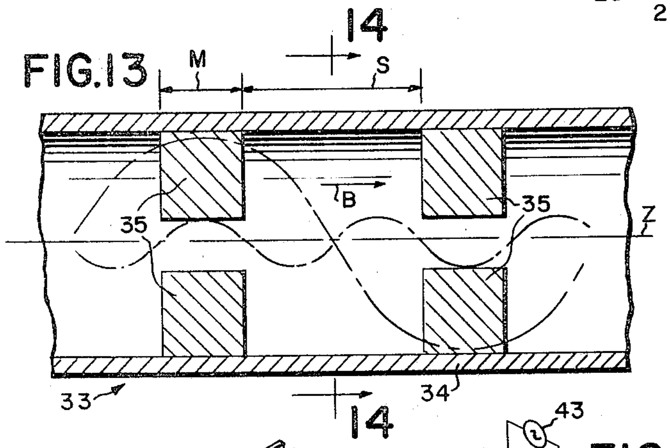
Figure 14:
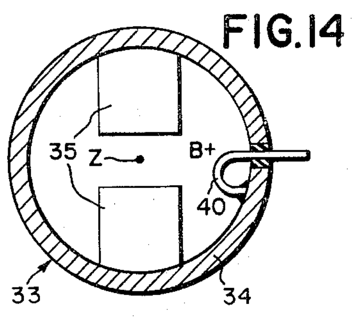
Figure 15:
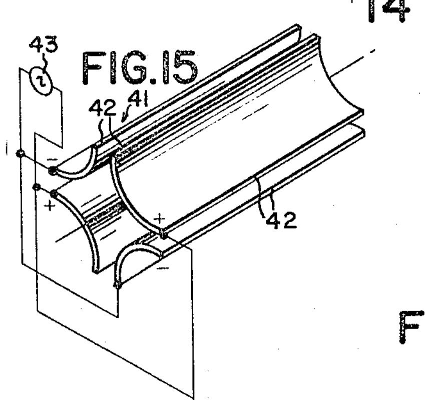
Figures 16, 17:
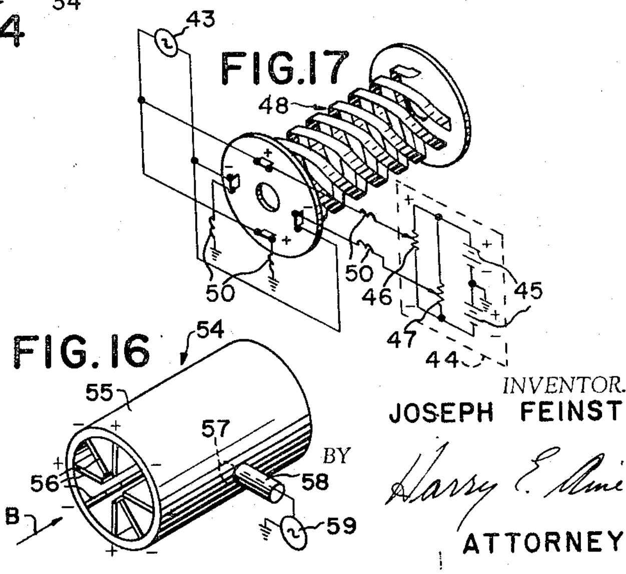
Figure 18:
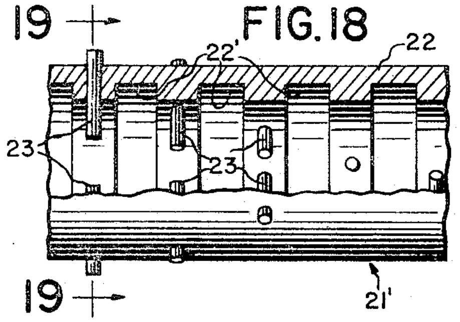
Figure 19:
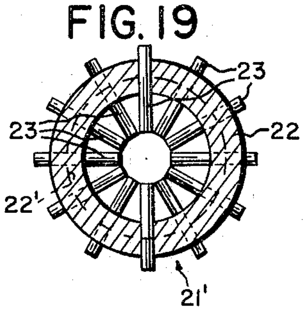
Figure 20:
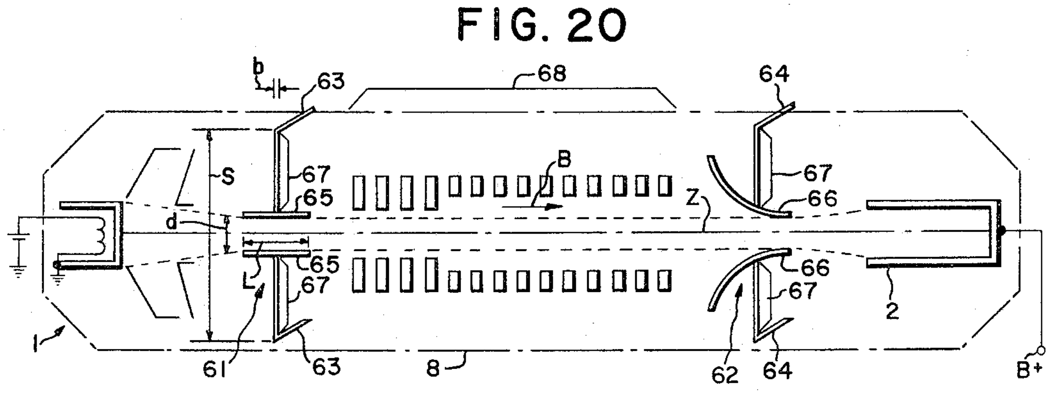
Figure 22:
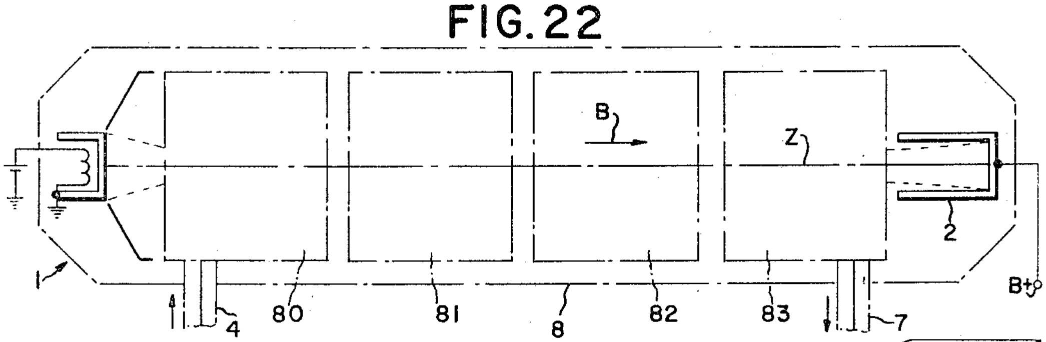
Figure 21:
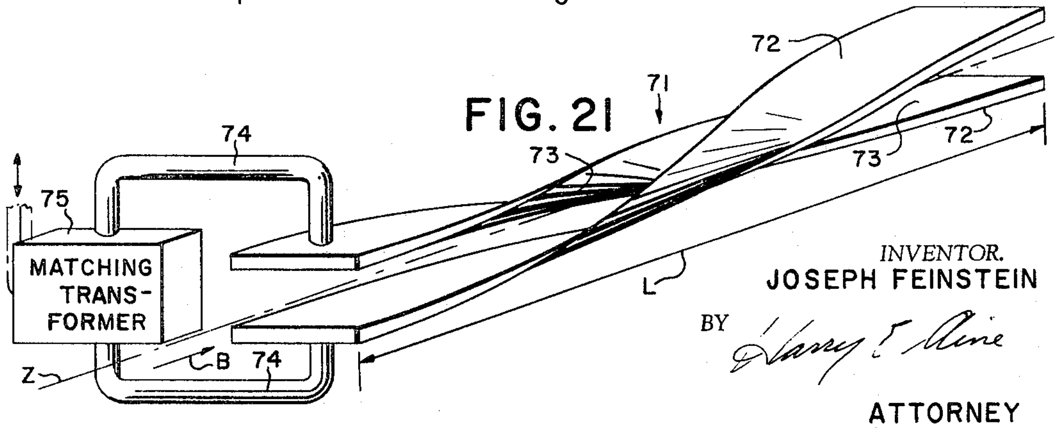

FIG. 2 is an external side view of a resonant cavity two pin transverse wave beam coupler of the present invention, FIG. 3 is a cross sectional view of the structure of FIG. 2 taken along line 3—3 in the direction of the arrows, FIG. 4 is a graph of transverse beam coupling response vs. axial length of the common interacting beam-field transverse electric field region, FIG. 5 is a frequency vs. phase constant diagram for various beam coupled circuits and showing splitting of the fast and slow cyclotron waves, FIG. 6 shows the envelope of charged particle trajectories for a linearly polarized beam, i.e., carrying equally excited slow and fast cyclotron waves, FIG. 7 shows a longitudinal cross sectional view of a D.C. pump quadrupole amplifying section, FIG. 8 shows a cross sectional view of the structure of FIG. 7 taken through line 8—8 in the direction of the arrows, FIGS. *9a–9d* show in diagrammatic form the electric interaction between the rotating linearly polarized beam and the D.C. fields of the quadrupole amplifier at quarter cycle positions of the cyclotron cycle, FIG. 10 is a schematic drawing depicting the interaction between the electrons of the twisting linearly polarized beam with the longitudinal D.C. fields of the quadrupole D.C. amplifier section over one cyclotron orbit, FIGURE 11 is an enlarged schematic isometric view of a twisted array of resonant two pin couplers of the present invention, FIG. 12 is an isometric view of a transverse meander line beam coupler of the present invention, FIGURE 13 is a schematic view of a space harmonic beam coupler of the present invention, FIG. 14 is a fragmentary cross sectional view of a portion of the structure of FIG. 13 taken along line 14—14 in the direction of the arrows, FIG. 15 is an isometric view of a quadrupole subharmonic beam coupler of the present invention, FIG. 16 is aschematic perspective view of an octapole subharmonic beam coupler of the present invention, FIG. 17 is an isometric view of a quadrupole subharmonic beam coupler of the present invention, FIG. 18 is a fragmentary partial cross sectional side elevational view of twisted array of resonant pin couplers of the present invention, FIG. 19 is a cross sectional view of the structure of FIG. 18 taken along line 19—19 in the direction of the arrows, FIG. 20 is a schematic side elevational view of a parametric beam amplifier of the present invention, FIG. 21 is an isometric schematic view of a novel beam coupler of the present invention, and FIG. 22 is a schematic view of a multi-coupler amplifier tube of the present invention.

Referring now to FIG. 1 there is shown a parametric beam amplifier tube apparatus utilizing certain features of the present invention. More particularly, a source of charged particles, as for example, an electron gun 1 develops and projects a stream of electrons over a predetermined beam path to a collecting electrode 2. The electron gun 1 may be entirely conventional and preferably includes the usual cathode together with suitable focusing and accelerating electrodes for developing a well defined beam of electrons. For convenience of illustration, this electron gun has been represented merely by the usual symbol for an indirectly heated cathode. The electron collector 2 usually takes the form of an anode biased at a positive potential with respect to the cathode as indicated by potential source B+. For purposes of explanation the longitudinal beam axis will be defined by the letter $z$, the positive $z$ direction being from electron gun assembly 1 to collector 2.

An input transverse wave beam coupler 3 is disposed surrounding the initial portion of the beam path $z$ and serves to excite a transverse signal wave on the beam, the signal being derived from a source (not shown) and fed to the input portion of the coupler 3 via coaxial line 4. The transverse wave at the signal frequency induced onto the beam by the coupler 3 is carrier by the beam through a drift region 5 having an odd quarter cyclotron wave drift length $d_d$ between input and output couplers 3 and 6, respectively.

Amplification takes place predominantly in the drift region $d_d$. The amplified wave energy is then extracted from the beam via an output transverse wave beam coupling section 6 and fed to a load (not shown) via output coaxial line 7. The output transverse wave beam coupler 6 is preferably of the same type as the input transverse wave beam coupler 3. An amplifying tube of the type as shown in FIG. 1 provides suitable amplification of the applied R.F. signal and possesses unilateral stability provided spiral pin or meander line couplers 21 and 20 of FIGS. 11 and 12, respectively, are utilized for elements 3 and 6. Such a tube also avoids beam blowup sometimes previously encountered with the use of D.C. quadrupole amplifying structures, previously used in parametric beam tubes.

A magnetic field B is provided axially of the beam extending through the beam couplers 3 and 6 and drift section 5. The magnitude of the magnetic field B is determined by the type of beam couplers 3 and 6 utilized. The relationship between magnetic field intensity B and the type of beam coupling device utilized will be more fully described later in the specification. The axial magnetic field may be produced by a solenoid or a suitable permanent assembly (not shown).

A vacuum envelope 8 encloses the tube elements, referred to above, and is evacuated to a suitable high vacuum as is customary in the electron discharge art.

Referring now to FIGS. 2 and 3 there is shown a transverse wave beam coupler 9 of the present invention. Beam coupler 9 may be used as an alternative coupler to the couplers 3 and 6 of FIG. 1 when the drift section 5 is replaced by an amplifying structure 5′ of the conventional design as shown in FIGS. 7, 8 and 10. The coupler 9 includes a length of cylindrical waveguide 11 coaxially disposed of the electron beam $z$. Two metal pins 12 extend radially inwardly of the cylindrical guide 11 from diametrically opposed positions. The free ends of the pins 12 straddle the electron beam axis $z$. The two pins 12 and cylindrical guide 11 form a radially re-entrant cavity resonator or resonant chamber with the space between the free ends of the pins 12 defining a transverse beam-field interaction gap, as in the typical klystron resonator, with the exception of the important difference that the electron beam is projected through the electric fields of the resonator with the electron field vector being transverse to the axis $z$ of the electron beam. This coupler is especially suitable at $x$-band microwave frequencies.

The resonant two pin coupler 9 is excited via wave energy coupled into the resonator via a suitable coupling device such as coupling iris 13 provided in the side wall of the cylindrical guide 11 quadraturely spaced from the re-entrant resonant pins 12. A hollow waveguide 14 is affixed as by brazing to the cylindrical waveguide 11 externally thereof and the wave energy of the rectangular waveguide 14 is coupled through iris 13 into the two pin resonator. In use wave energy that is desired to couple onto the electron beam is applied, for excitation of the coupler 9, via waveguide 14. The resonant pins 12 serve to provide, between their free end portions, an electric field transverse to the direction of the electron beam and to impress on the electron stream a transverse signal wave at the signal frequency. The extent of the transverse electric field, taken in the direction of the beam along the $z$ axis, through which interaction with the beam occurs, is purposely made short compared to a cyclotron wavelength, where the cyclotron wavelength is defined as:

$$\lambda_c = \frac{8.35\sqrt{V_o}}{B} \quad (1)$$

where $\lambda_c$ is the cyclotron wavelength in inches, $V_o$ is the D.C. voltage corresponding to the axial velocity of electrons, and B is the longitudinal D.C. magnetic field intensity in gauss.

As an example of dimensions for a two pin coupler 9, for operation at a signal frequency of approximately 10 kmc., with an axial magnetic field intensity B of approximately 600 gauss and an electron beam voltage $V_o$ of approximately 6 kv., the cylindrical waveguide 11 is made approximately 0.5 inch in diameter; the pins 12 are approximately 0.070 inch in diameter. The spacing between the free ends of the re-entrant portions of the pins 12 are adjusted for resonance at approximately 10 kmc. leading to a .090″ gap. For this set of parameters the cyclotron wavelength $\lambda_c$ is approximately 0.80 inch. The axial length, in the $z$ direction, for the transverse interaction region or gap represents only 10% of the cyclotron wavelength $\lambda_c$, so that the resultant R.F. polarization is almost pure linear.

The coupling response A(B) of the resonant two pin coupler 9 as a function of its phase constant, B, can be seen by reference to FIG. 4. More specifically, this response follows a $$\frac{\sin x}{x}$$

type distribution indicating that the shorter the length L of the coupler as compared to a cyclotron wavelength the higher the wave numbers that such a coupler will excite. The importance of a short coupler in connection with excitation of fast and slow cyclotron waves can be more clearly seen from the diagram of FIG. 5 wherein there is shown the typical frequency $\omega$, vs. phase constant B, diagram for a beam split into fast and slow transverse cyclotron waves, as shown.

Superimposed upon this diagram is the response A(B) for the two pin coupler when the length L, of the coupler is short compared to a cyclotron wavelength. From that superimposed response it can be seen that both the fast and slow cyclotron waves are substantially equally excited by the two pin coupler 9 thereby producing a desired linear polarization of the transverse waves on the electron stream, such linear polarization manifesting itself by forming the envelope of electron trajectories, as they leave the coupler 9, into a thin ribbon, the ribbon twisting at a rate equal to the cyclotron frequency.

The resonant two pin coupler 9, in addition to satisfying the above relationships with regard to length in the $z$ direction, also satisfies a design parameter that the beam transient time T is equal to one-half of an R.F. cycle at the signal frequency $\omega_s$ corresponding to the center frequency of the frequency response of the coupler 9, that is, $$T=\pi/\omega_s \qquad (2)$$

This later design parameter is also used in other beam coupler embodiments of the present invention and its particular advantages will be more fully described below with regard to FIG. 20.

The thin twisting linearly polarized beam can be seen by reference to FIG. 6. This type of beam is especially desirable for application to a D.C. quadruple pump section, as shown in FIGS. 7–9, since all the electrons in the beam are in a position to receive maximum amplification, assuming the beam is properly introduced to such structure, as described below.

Figures 9A, 9B, 9C, 9D:
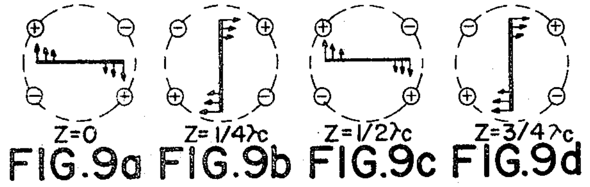

The amplification or gain mechanism can be more fully comprehended from an examination of FIGS. 9 and 10 wherein it can be seen that the electrons within the twisting ribbon beam, when introduced into the D.C. pump structure, in the phases shown in FIGS. 9*a*–9*d*, all experience a net rotational amplification throughout the entire cyclotron orbit. Thus, the drifting electrons within the ribbon gain rotational energy as they lose drift energy since it will be noted that the electrons are always in a condition to be slowed down by the axially directed D.C. components of the quardupole structure. Actually no net energy is transferred from the quadrupole fields to the beam. Instead energy is merely transferred from the slow cyclotron wave to the fast cyclotron wave, due to the coupling characteristics of the structure as shown in FIG. 5 by the triangular marks on the fast and slow cyclotron waves spaced apart by a phase constant of $2\omega_c/v$.

Entrance of the linearly polarized beam, or ribbon shaped beam, into the first set of quadrupole plates is preferably made in an orientation as shown in FIG. 9*a*, i.e., in a midpotential plane. However, if the beam enters the first set of quadrupole plates rotated 90° from the position shown, this would correspond to a de-energization orientation of the beam. This condition would be easily remedied by externally reversing the quadrupole voltage polarity. However, if the beam should enter rotated 45° to the position shown in FIG. 9*a* a gain reduction would result.

Therefore, to realize the advantages of a linearly polarized beam, i.e., one in which both the slow and fast cyclotron waves are equally excited, care is preferably exercised in choosing the angle, which the polarization vector of the beam makes with the transverse midpotential axes of the quadrupole section. This means that the distance from the center of the pin of input coupler 9 or from the last pin pair of the spiral coupler 21 of FIG. 1 or 11 to the first set of quadrupole plates is preferably an integral number of quarter cyclotron wavelengths, that is, $$d=n\lambda_c/4 \qquad (3)$$

where $n=1, 2, 3, 4 \ldots$ Equation 3 assumes that the beam as it leaves the input coupler is substantially linearly polarized along an axis in alignment or parallel to a midpotential plane axis of the D.C. quadrupole pump structure of FIGS. 7–10, as indicated at each quarter wave position in FIGS. 9*a*–9*d*. If there is an angular difference $\theta$ between the alignment of these separated axes then the electrical distance $d$ between these points includes the actual physical distance plus a corrective distance $d_c$ defined by Equation 5, below.

Likewise in the structure of FIG. 1 the total distance $d_t$ between the end of the input and beginning of the output couplers 3 and 6 is preferably equal to an odd integral number of electrical quarter cyclotron wavelengths, that is, $$d_t=n\lambda_c/4 \qquad (4)$$

with $n$ odd.

Likewise, Equation 4 assumes that the last pin pair of the input coupler 3 is aligned in the same direction, or parallel, with the first pin pair of the output coupler 6. If there is an angular difference $\theta$ between the alignment of these separated pin pairs then the electrical distance $d_t$ between these pin pairs includes the actual physical distance plus a corrective distance $d_c$ where:

$$d_c=\theta\lambda_c/360° \qquad (5)$$

where $\theta$ may be plus or minus and is positive in the direction of the spiraling of the couplers. Thus, if $\theta=-90°$ (a rotation of the pin sets opposite to the spiral direction) then no space need be left between the two couplers. These proportions are preferably maintained in tubes designed to take optimum advantage of a linearly polarized beam.

A comparison of the two pin resonant coupler 9 with the prior art Cuccia coupler shows then that it provides a transverse electric field-beam interaction region which is short compared to a cyclotron wavelength instead of providing a length substantially equal to or greater than a cyclotron wavelength. The two pin resonant coupler also provides equal excitation of the fast and slow waves and thereby produces a linearly polarized twisted ribbon shaped beam at the output thereof as opposed to a conical beam envelope produced by the prior art Cuccia coupler which excites substantially only the fast cyclotron wave. Moreover, the two pin resonant coupler 9 is characterized by operating at an axial magnetic field intensity B which may be substantially less than the cyclotron resonance magnetic field intensity at the signal frequency whereby a greatly reduced magnetic field requirement is obtained using the resonant two pin coupler, as opposed to the Cuccia coupler.

One disadvantage of the two pin resonant coupler 9 is that it is relatively narrow band since the impedance of the beam may be matched to the impedance of the gap of the coupler 9 only over a relatively narrow band of frequencies as of, for example, 100 megacycles at 10 kmc. thereby yielding substantially a 1% bandwidth between 3 db points.

Referring now to FIG. 11 there is shown a broad-band transverse wave beam coupler 21 of the type schematically indicated in FIG. 1 as the input and output couplers 3 and 6. Coupler 21 includes an array of resonant two pin couplers 23 inwardly directed of a cylindrical waveguide 22, the two pin couplers of the array being longitudinally spaced by a distance $S_z$ along the $z$ axis of the beam.

The gap between the radially re-entrant free ends of the pins 23 define therebetween the electric field-beam interaction gap disposed substantially at right angles to the $z$ axis of the electron beam. As in the two pin coupler of FIGS. 2 and 3 the longitudinal extent of the electric field interaction gap for each pair of pins 23 is made small with respect to the cyclotron wavelength $\lambda_c$ and preferably also satisfies the previously described $T\leqq\pi/\omega_s$ relationship.

The array is twisted substantially at the twist rate of the linearly polarized beam after it passes through the first two pin couplers of the array. In this manner the beam sees the same spatial orientation of electric vector all the time it is in the coupler 21 thereby preserving linear polarization.

The longitudinal spacing $S_z$ of the sets of pins 23, along the $z$ axis, is designed to match the signal wave velocity to that of the synchronous beam wave velocity. This matching of the wave velocity to the beam velocity can be more readily seen by reference to FIG. 5 wherein it is shown that the circuit wave propagating along the array of pin pairs, which are capacitively coupled together, by their inter-pin capacity have the typical capacitively coupled positive group velocity characteristic for the zero to $\pi$ mode for the pass band $\omega_1$ to $\omega_2$. The capacitively coupled slow wave structure is thus matched to the beam cyclotron wave velocities over a relatively wide band yielding a relatively wide pass band.

In another spiral pin coupler embodiment (see FIGS. 18 and 19) a backward wave characteristic is obtained by increasing the diameter of the cylinder sections between the pin sets, so as to accentuate the inductive coupling. More particularly, the waveguide sections 22', disposed in-between waveguide sections 22 containing the pin pairs 23, are made of slightly enlarged inside diameter to produce predominantly inductive coupling between resonant pin pairs 23. This predominant inductive coupling yields a backward wave fundamental and forward traveling first space harmonic circuit wave characteristic as shown in the dotted line of FIG. 5. This circuit characteristic is then used for broad-band beam coupling by synchronizing the forward traveling first space harmonic of the circuit wave with the synchronous beam wave thereby exciting both fast and slow cyclotron beam waves.

The magnetic field requirement B for spiral pin couplers shown in FIGS. 11 and 18 is much reduced over that required for cyclotron resonance at the signal frequency thus making the coupler 21 especially suited for use with D.C. quadrupole amplifying sections which are preferably operated at magnetic field intensities B substantially below the magnetic field intensity for cyclotron resonance at the signal frequency.

Excitation for the coupler 21 may be had via a coupling iris as shown for the two pin couplers of FIGS. 2 and 3 or as shown in FIG. 11 via an inductive coupling loop 24 or by means of a two wire line or ridged waveguide which makes contact with the first set of two pins 23. The coupling loop 24 is connected to the center conductor 25 of a coaxial cable (not shown) for feeding wave energy into the coupler 21. The plane of the inductive coupling loop 24 preferably lies in the transverse plane of the cylindrical waveguide 22 for obtaining maximum inductive coupling to fields of the coupler 21. As an alternative means for excitation, the center line of the coaxial cable 25 would extend inwardly of the cylindrical guide 22 to form one of the pins 23 of a two pin set as schematically indicated in FIG. 1.

Referring now to FIG. 12 there is shown an alternative broad-band transverse wave beam coupler embodiment 20 of the present invention. More specifically, a pair of meander line fins or circuits 26 are disposed straddling the electron beam axis *z*. The innermost edge portions of the meander line fins 26 are disposed in transverse registry such that the mutually opposed inner surfaces of the meander lines 26 form a parallel wire transmission line 27 that is folded back and forth transversely of the beam axis *z*. The height *h* of the individual meander line circuits 26 is dimensioned to provide a quarter wavelength choke or high impedance current path between longitudinally spaced apart ridge segments of the meander line 26.

The meandering parallel transmission line 27 provides an electric field vector which is transverse of the beam axis *z*, between opposing fins, in the desired mode of operation. The thickness of each of the space displaced transverse electric field-beam regions, between parallel conductors 27 of the meandering parallel transmission line, is small, in the *z* direction, compared to a cyclotron wavelength $\lambda_c$. In this manner both the fast and slow cyclotron waves may be substantially equally excited resulting in linear polarization of the electron beam, if desired.

The meandering parallel wave transmission line 27 serves to slow down the circuit wave velocity to substantially the same velocity as the beam, in the manner as indicated in FIG. 5 for the circuit wave of the apparatus of FIG. 11. Beam coupler 20 provides either a circularly or a linearly polarized beam wave depending on the choice of beam voltage.

The meander line fins 26 are preferably carried from base plates 28 as by brazing at the abutting edge portions thereof. The plates 28 are preferably made of a good electrical and thermal conducting material to facilitate construction of the quarter wave choke and for conducting thermal energy from the thin fins to the plates 28.

Excitation for the parallel meander line circuit 27 is obtained by attaching the center conductor 27 of a coaxial line to the inner edge of the meander line 27 or by a ridge waveguide, the two ridges making contact respectively with the two fins. As in the case of couplers 9 and 21, coupler 20 may be employed to advantage as an output beam coupler as well as an input coupler. Octave bandwidths have been obtained with coupler 20.

Referring now to FIGS. 13 and 14 there is shown a subharmonic transverse wave beam coupler 33 for coupling signal energy to the fast cyclotron wave at magnetic field intensities substantially below the cyclotron magnetic field intensity for the signal frequency. More specifically, the fast cyclotron wave is coupled to one of the higher order space harmonics of the coupling structure 33 at subharmonic magnetic field intensity less than the cyclotron resonance frequency at the signal frequency.

The structure of the space harmonic transverse wave beam coupler 33 includes a length of cylindrical waveguide 34 having diametrically disposed mutually opposed ridge portions 35 straddling the beam axis *z*. The overall length of the ridged portion of the waveguide 34 is in the order of at least one cyclotron wavelength as indicated by the dashed line.

Portions S of the ridge 35 are removed to leave the remaining metal portion M. The ratio of the remaining metal portion M to the removed portion S defines the desired space harmonic at which it is desired to match the fast cyclotron wave to the group velocity of the coupler 33. The space harmonic coupling is indicated by the higher frequency dotted subharmonic line of FIG. 13 and can be seen with regard to the $\omega-\beta$ diagram shown in FIG. 5. In that diagram $\omega_4$ and $\omega_5$ define the pass band of beam coupler 33. It can be seen that the fast cyclotron wave is coupled to the third space harmonic over the pass band of the coupler 33.

By arranging the R.F. field pattern of the coupler 33 so that the beam sees the R.F. field only for a short interval spaced harmonically, energy transfer can occur with a much reduced magnetic field. For a one-third metal to space ratio, *M/S*, one-third of the cyclotron resonance magnetic field intensity B may be used for wave energy transfer from the coupler 33 to the fast cyclotron wave.

The advantages of coupling substantially only to the fast cyclotron wave, as obtained by the coupler 33, are that proper matching of the impedance of the coupler 33 to the impedance of the fast cyclotron wave allows the signal energy to be imparted to the beam while withdrawing noise energy from the fast cylotron wave of the beam. The withdrawn noise is then dissipated in a suitable matched load.

Signal wave energy is coupled into the coupler 33 via a suitable loop 40 with the plane of the loop being substantially aligned with the transverse plane of the cylindrical guide 34 or by means of a ridge waveguide or a two wire line. The amplified signal on the fast cyclotron wave may be extracted by a coupler substantially the same as coupler 33 located downstream of the amplifying section 5' and surrounding the electron beam.

Referring now to FIG. 15 there is shown another subharmonic transverse wave beam coupler 41 of the present invention. More specifically, four deflection plates 42 are quadraturely spaced with respect to the beam axis *z*. The axial extent, in the *z* direction, of the plates 42 is substantially equal to or greater than one cyclotron wavelength. A signal source 43 is connected via suitable leads to the plates 42 in a manner to produce a quadrupole field of alternating polarity circumferentially of the beam as shown in the drawing. As in the space harmonic structure of FIG. 13 the quadrupole structure of FIG. 15 produces a space harmonic, in the quadrupole case the second harmonic, which will couple to the fast cyclotron wave corresponding to a cyclotron resonance frequency at a magnetic field intensity substantially less than the magnetic field intensity for cyclotron resonance at the signal frequency. More specifically, the magnetic field utilized is reduced to $B/N$, where B is the cyclotron magnetic field intensity at the signal frequency and N is the number of pairs of electric poles. Accordingly, for the structure of FIG. 15 the magnetic field intensity B, preferred for coupling the signal wave to the fast cyclotron wave at the signal frequency, is ½ the magnetic field intensity requried to produce cyclotron resonance at the signal frequency.

Noise may be removed from the fast cyclotron wave by matching the impedance of the source 43 to the beam impedance of the quadrupole structure 41. Also, the coupler 41 may be used as an output beam coupler 6 for coupling amplified signal energy from the beam.

Referring now to FIG. 16 there is shown an alternate transverse wave multipole coupler beam coupler 54 embodiment of the present invention. More specifically, there is shown a length of cylindrical waveguide 55 having a plurality of pairs of poles or fins 56 inwardly directed thereof. The pairs of fins are diametrically disposed. This coupler 54 includes the provision of four pairs of poles 56, for a total of eight poles disposed about the circumference of the beam, and the array of eight poles being coaxially disposed of the beam axis $z$. This coupler is a special case of the coupler 41 previously described with regard to FIG. 15.

The poles 56 are excited by any suitable means such as, for example, a loop 57 extending into the waveguide 55 through an opening therein, the loop 57 communicating with a suitable transmission line as of, for example, a coaxial transmission line 58, which in turn is connected to a source of signals 59 which it is desired to impress on or couple to the electron beam. The coupler 54 of FIG. 16 is preferably operated at a resonant condition producing the octapole pattern as shown, i.e., with adjacent peripherally spaced poles 56 having opposite polarities.

In operation, the type of beam coupler structure shown in FIGS. 15 and 16 is characterized by a rotating field in synchronism with the cyclotron frequency (thereby producing a circularly polarized beam). By using a plurality of poles the electrons angularly rotate from one pole pair to the next pole pair in ½ and R.F. signal cycle, so that high signal frequencies may be used with low fields. In this type of coupled the condition of synchronism exists from the point of view of angular rotation.

A reduced magnetic field as compared to the cyclotron magnetic field intensity at the signal frequency may be employed with coupled 54. More specifically, the magnetic field intensity B required for the octapole coupler of FIG. 16 is $B/4$ or, more generally, $B/n$ where $n$ is the number of pairs of electric poles disposed peripherally about the beam axis $z$.

Fins 56 may be twisted throughout the length of the coupler 54 to provide a twisted array, the twist rate corresponding to the difference between the coupler's resonant frequency and the cyclotron resonance frequency in a magnetic field of intensity $n$B, where $n$ is the number of pairs of electrical poles and B is the actual magnetic field intensity directed axially of the beam axis $z$.

Referring now to FIG. 17 there is shown a transverse wave beam coupler 48 of the present invention. This quadrupole coupler 48 approximates the quardupole geometry of the structure of FIG. 15 modified, however, by twisting the quadrupole plates of the structure of FIG. 15 at a twist rate corresponding to the shift in signal frequency from the value corresponding to twice the cyclotron resonance frequency in the given magnetic field B. In operation the twisted quadrupole coupler 48, of FIG. 17, operates substantially in the same manner as the quadrupole coupler of FIG. 15.

A signal generator 43 is connected to the conductive twisted poles 51 in the manner as indicated in the drawings to produce a quadrupole field. This coupler 48 operates substantially at a magnetic field intensity corresponding to one-half of the cyclotron magnetic field intensity at the signal frequency.

Another feature of the quadrufilar beam coupler 48 is the provision of means for supplying independent adjustable D.C. voltages between separate helices of the quadrufilar helix for steering the beam and preventing unwanted beam interception on the quadrufilar structure caused, for example, by slight misalignment of the electron gun structure and the quadrufilar structure.

An adjustable source of D.C. potential 44 is connected to the quadrufilar helices to provide an adjustable D.C. voltage component between diagonally opposite helices of the quadrufilar helix, such diagonally opposite helices being operated at the same A.C. potential. Since the helices of the quadrufilar helix 48 twist at the same spatial rate as the beam, a cumulative deflection is obtained, which when properly adjusted will null out initial beam deflection produced by mechanical misalignment of the helices and electron gun structure 1.

The adjustable D.C. potential source 44 preferably consists of a grounded center tapped battery 45 and two independently adjustable slide wire resistive pick offs 46 and 47 each capable of applying to a particular helix electrode to which connected, an adjustable D.C. potential which may be either positive or negative relative to its diagonally opposite, D.C. grounded, helix. R.F. chokes 50 permit independent operation of the D.C. potentials and the R.F. signal energy.

Another use of the quadrufilar helix structure is as a D.C. pumping structure for amplification of signal energy on the beam. In this context the quadrufilar helix is supplied with D.C. polarities the same as the A.C. polarities indicated in FIG. 17 and as such approximates the D.C. quadrupole structures of FIGS. 7–10. The twist rate of the individual helices of quadrufilar D.C. pump is the same as the twist rate of the beam.

Beam steering adjustable D.C. potentials may be applied between diagonally opposite helices, in the manner as shown with respect to FIG. 17, to compensate for misalignment between the beam and the D.C. quadrupole quadrufilar structure.

Referring now to FIG. 20 there is shown an alternative parametric beam amplifier tube of the present invention. The same numerals have been used to describe like elements to those of FIG. 1.

In this embodiment extremely broad-band operation is obtained by the provision of especially broad-band input and output R.F. transverse electric beam wave couplers 61 and 62 respectively.

Beam couplers 61 and 62 are characterized by limiting the length L of the coupler to the following relationship:

$$L \leq v./2f_0 \qquad (6)$$

where $f_0$ is the center frequency of the R.F. coupling response of the coupler; $v$ is the axial velocity of the beam particles.

Using a short beam coupler, as shown in FIG. 20 and characterized by Equation 6, maximum power transfer is obtained between the beam and the coupler. Stated another way the beam coupler's circuit impedance is matched to the R.F. beam impedance.

Transmission lines 63 and 64, which propagate a TEM wave, are terminated by beam couplers 61 and 62, respectively, having circuit impedances approximately equal to both the characteristic impedance of the transmission lines 63 and 64 and the R.F. beam impedance.

For example, for a beam velocity corresponding to a beam voltage of 5 kv., at a center passband frequency $f_o$ of 840 mc., we obtain a beam coupler length of about 1 inch. If the plate separation $d$ is taken to be 0.3 inch and the beam current $I_o=0.702$ amps., then the beam coupler circuit impedance is 1300 ohms.

The characteristic impedance of the two wire transmission line 63 is 492 ohms if the wire spacing S is taken as 1.5 inches and wire diameter $b$ is 0.050 inch. This impedance mismatch of 1300Ω to 492Ω corresponds to a circuit transfer efficiency of 85% so that most of the power is coupled to the beam.

The two wire lines 63 and 64 are preferably led into balun transformers, not shown, to match to coaxial lines, not shown. The design of such broadband transformers is well known, bandwidths of 100:1 are obtainable. Alternatively, the parallel two wire lines 63 and 74 could be connected directly to suitable antennas. The over-all bandwidth of such matched couplers 61 and 62 is in the order of an octave or more. More specifically, the bandwidth for the above cited dimension yields a useable bandwidth from 0 to 1680 mc.

The high frequency response of the beam couplers 61 and 62 is improved by resonating the capacitance of the coupler plates 65 and 66 with the self inductance of the lead wire 67 from the two wire lines 63 and 64 at the high frequency end of the frequency response characteristic of the beam couplers 61 and 62.

For example, assuming the above mentioned dimensions and, in addition, the plates 65 and 66 are taken to be about 0.5 inch wide then their capacitance is about 0.3 $\mu\mu$f. The self inductance of the lead wires 67 is about 0.02 $\mu$h. This combination resonates at about 1000 mc. and peaks up the high frequency response of the couplers 61 and 62.

In operation signal wave energy, within the response band of the input coupler 61, is impressed on the beam as transverse beam waves. These beam waves are amplified in the D.C. quadrupole section 68 in the manner as previously described with regard to FIGS. 7–10, such amplification being essentially frequency insensitive.

In the amplifying mechanism forward kinetic energy of the beam is converted into rotational energy of the electron orbits such that the electron orbits increase in radius progressively along the length of the beam within the D.C. quadrupole amplifier section 68.

In a preferred embodiment of the present invention the inside diameter of the D.C. quadrupole amplifier elements is increased lengthwise of the quadrupole section 68 to accommodate the increased radius of the electron orbits. For example, the inside radius of the quadrupole section 68 at the upstream end is approximately 0.6 inch whereas at the downstream end the inside diameter is 0.9 inch.

The output coupler 62, in a preferred embodiment, is provided with an outwardly flared entrance at the upstream end thereof to accommodate the enlarged diameter orbits of the electrons. As the rotational energy is extracted from the beam via the output coupler 62 the diameter of the electron orbits decreases and therefore the spacing between plates or members 66 of the coupler 62 converge to maintain close spacing to the beam and thus a high degree of coupling to the beam.

The extremely broad-band characteristics of the amplifier of FIG. 20 lends itself particularly well to the provision of a wide band noise generator. More specifically, the apparatus according to FIG. 20, slightly modified to remove the input coupler 61 if desired, and including the provision of threading the cathode emitter with the magnetic field B, provides the noise generator.

Electrons are emitted from a cathode surface with an average energy of 0.1 electron-volt. This represents incoherent or noise energy spread over the spectrum in accordance with the $k$TB relation. If the electron gun is immersed in the magnetic field B, so that magnetic field lines link the cathode, then the transverse components of this random velocity will be converted to cyclotron orbits in the same manner that the transverse field of the input coupler of the amplifier creates cyclotron rotation of the electrons.

This noise energy is then amplified by the quadrupole section 68 and the noise finally collected from the beam by an output coupler 62.

Thus, a typical 42 db of gain applied to 0.1 electron-volt of energy would yield electrons with 1.5 kev. of rotational noise energy. The non-linear manner in which this type of amplifier saturates would limit the amount of noise energy in the high frequency end of the spectrum and thus concentrate more of it in the desired frequency range, i.e., below 1000 mc. Spectral power densities of the order 1 watt/mc. would be obtained.

Referring now to FIG. 21 there is shown an alternative transverse wave beam coupler of the present invention. This twisted two plate coupler 71 has the advantage of providing good electric coupling to the beam at axial magnetic field intensities well below the magnetic field intensity corresponding to the cyclotron resonance field intensity $B_c$ at the signal frequency of the center of the coupling response of the coupler 71. Thus, twisted coupler 71 is especially useful at high signal frequencies for use in transverse wave beam tubes where the beam focusing magnetic field intensity is desired to be minimized.

Coupler 71 includes a pair of mutually opposed spaced apart plates or members 72 having the beam axis $z$ disposed therebetween. The mutually opposed surface portions 73 of the members 72 are formed with an angular twist longitudinally of the length L of the coupler 71.

Maximum bandwidth for the coupler 71 is obtained when the twist rate of the coupler 71 is selected to yield zero phase slip between the electron beam and the electric field polarization vector of the applied transverse electric signal wave energy.

Phase slip $\phi$, in radians, for an electron beam in a twisted coupler 71 is found from the following relationship:

$$\phi=\frac{L}{V_o}[\omega_s-(\omega_c\pm\beta V_o)] \tag{7}$$

where L is the length of the coupler; $V_o$ is the beam velocity; $\omega_s$ is the signal frequency; $\omega_c$ is the cyclotron resonance frequency in the axial magnetic field intensity B, and $\beta$ is the twist rate of the coupler 71 in radians per unit length, the (−) sign is used when the twisting is in same direction as the electron orbit rotation in the applied beam focusing magnetic field intensity B, and the (+) sign is used for the opposite twist direction.

The phase slip $\phi$ is zero and therefore maximum bandwidth is obtained when:

$$\beta=\frac{\omega_s-\omega_c}{V_o} \tag{8}$$

where $\omega_s$ is the center band frequency of the coupled response.

Thus, it can readily be seen from Equation 8 that by increasing the twist rate $\beta$ of the two plate coupler 71 of FIG. 21 that it is especially useful at signal frequencies $\omega_s$ well above the cyclotron resonance frequency $\omega_c$ in the relatively low beam focusing magnetic field intensity B.

The twisted two plate coupler 71 is excited by signal R.F. energy fed to the plates 72 via, for example, a two wire line 74 matched to a suitable R.F. source, not shown, or load as appropriate, via matching transformer 75.

Referring now to FIG. 22 there is shown an alternative multi-coupler amplifier embodiment of the present invention. This embodiment is similar in certain respects to the structure of FIG. 1 with the exception that additional beam coupler elements 81 and 82 have been provided along the beam path intermediate the input and output beam couplers 80 and 83, respectively. Like numerals have been used to identify like parts to FIG. 1.

The intermediate couplers 81 and 82 preferably take the form of the twisted linear polarized transverse wave beam couplers of the present invention such as, for example, couplers 21 and 71. These couplers, when used as intermediate couplers, would not need to be excited with applied R.F. signal energy but operate as idler couplers in a manner analogous to intermediate cavities in a multicavity klystron amplifier.

The idler couplers 81 and 82 derive their excitation from the modulated beam and serve to increase the beam modulation and therefore the gain of the amplifier. The amplified wave energy is extracted from the beam via the output coupler 83 and fed to a suitable load, not shown.

The spacing inbetween the next preceding upstream coupler and the idler coupler and the electrical distance inbetween adjacent idler couplers is preferably an odd integral number of quarter cyclotron wavelengths properly compensated for differences in angular orientation of the electric polarization as set forth above with respect to the distance between input and output couplers 3 and 6 respectively of FIG. 1. More particularly, this distance *dt* is specified by Equations 4 and 5.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an electron discharge device in which an electron beam is modulated with a transverse beam wave at a signal frequency and projected along a predetermined path, means for producing a magnetic field B directed along the beam path, a beam coupler for transferring signal wave energy between the beam and a circuit over a band of frequencies centered about a given signal frequency, said beam coupler including a pair of mutually opposed conductive member portions transversely disposed of the beam path with the beam path passable therebetween, means for exciting said mutually opposed conductive member portions with an alternating voltage at the signal frequency to produce an alternating electric field transverse to the beam path for transferring signal wave energy between the beam and said mutually opposed conductive member portions, and one of said mutually opposed conductive member portions having a full extent axially coextensive with said beam path which is less than $$\frac{8.35\sqrt{V_o}}{5B}$$

inches where $V_o$ is D.C. voltage corresponding to the axial velocity of the electrons flowing along the beam path and B is the axial magnetic field intensity in gauss, whereby substantially linear polarization of the beam is obtained over the operating band of frequencies of said beam coupler.

2. The apparatus according to claim 1 wherein said pair of mutually opposed conductive member portions also have an axial extent along the beam path which is also less than $V/f_0$ where V is the axial velocity of the electrons flowing along the beam path and $f_0$ is the center frequency of the transfer characteristic of said beam coupler, whereby broadband relatively efficient beam coupling is obtained.

3. The apparatus according to claim 2 wherein said pair of mutually opposed conductive member portions is defined by the free end portions of a pair of mutually opposed pins, said pins extending toward each other from the inside walls of a conductive chamber, said pins and said chamber forming a re-entrant cavity resonator having a resonant frequency at the center frequency $f_0$ of the transfer characteristic of said beam coupler within the operating band of frequencies of said beam coupler.

References Cited by the Examiner

UNITED STATES PATENTS

| | | | |
|---|---|---|---|
| 2,959,740 | 11/1960 | Adler | 330—4.7 |
| 2,974,252 | 3/1961 | Quate | 330—4.7 |
| 3,148,302 | 9/1964 | Clavier et al. | 330—4.7 |
| 3,218,503 | 11/1965 | Adler | 330—4.7 |
| 3,231,825 | 1/1966 | Forester et al. | 330—4.7 |
| 3,233,182 | 2/1966 | Adler | 330—4.7 |

OTHER REFERENCES

Udelson: "Proc. IRE," August 1960, pp. 1485–1486.

ROY LAKE, *Primary Examiner.*

ARTHUR GAUSS, *Examiner.*

D. R. HOSTETTER, *Assistant Examiner.*